(12) United States Patent
Momose et al.

(10) Patent No.: US 11,055,994 B2
(45) Date of Patent: Jul. 6, 2021

(54) INFORMATION PROCESSING DEVICE, INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Hirofumi Momose, Numazu (JP); Hideto Fujishima, Miyoshi (JP); Naoki Kurokawa, Tokyo (JP); Yuki Tao, Nagoya (JP); Yasuhisa Obata, Nagoya (JP); Hiroki Iida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/731,983

(22) Filed: Dec. 31, 2019

(65) Prior Publication Data
US 2020/0242925 A1    Jul. 30, 2020

(30) Foreign Application Priority Data

Jan. 24, 2019    (JP) .............................. JP2019-010526

(51) Int. Cl.
| G08G 1/0967 | (2006.01) |
| G08G 1/0962 | (2006.01) |
| B60Q 5/00 | (2006.01) |
| B60K 35/00 | (2006.01) |
| B60R 1/00 | (2006.01) |

(52) U.S. Cl.
CPC ....... *G08G 1/0967* (2013.01); *G08G 1/09626* (2013.01); *B60K 35/00* (2013.01); *B60K 2370/1529* (2019.05); *B60K 2370/21* (2019.05); *B60Q 5/005* (2013.01); *B60R 1/00* (2013.01); *B60R 2300/107* (2013.01); *B60R 2300/205* (2013.01); *B60R 2300/804* (2013.01)

(58) Field of Classification Search
CPC .............. G08G 1/0967; G08G 1/09626; B60R 2300/205; B60R 1/00; B60R 2300/804; B60R 2300/107; B60K 35/00; B60K 2370/1529; B60K 2370/21; B60Q 5/005
See application file for complete search history.

(56) References Cited

U.S. PATENT DOCUMENTS

2014/0309864 A1* 10/2014 Ricci ................... G01C 21/3691
701/36
2017/0089710 A1* 3/2017 Slusar ................ G01C 21/3602

FOREIGN PATENT DOCUMENTS

JP    2017-151942 A    8/2017

* cited by examiner

*Primary Examiner* — James J Yang
(74) *Attorney, Agent, or Firm* — Sughrue Mion, PLLC (57) ABSTRACT

An information processing device has an obtaining unit, a controller, and a giving unit. The obtaining unit can obtain vehicle information. The controller creates first warning information when the passability of a road in the vehicle information indicates non-passable. The controller creates recovery information when the passability of the road at the same position in the vehicle information indicates passable, after creation of the first warning information. The giving unit gives the recovery information.

7 Claims, 9 Drawing Sheets

INFORMATION PROCESSING DEVICE, INFORMATION PROCESSING SYSTEM, PROGRAM, AND INFORMATION PROCESSING METHOD

INCORPORATION BY REFERENCE

The disclosure of Japanese Patent Application No. 2019-010526 filed on Jan. 24, 2019 including the specification, drawings and abstract is incorporated herein by reference in its entirety.

BACKGROUND

1. Technical Field

The disclosure relates to an information processing device, information processing system, program, and information processing method.

2. Description of Related Art

It is known to improve a wide variety of convenience, by communicating a wide variety of information using communication functions included in vehicles. For example, a communication system as described in Japanese Unexamined Patent Application Publication No. 2017-151942 (JP 2017-151942 A) is allowed to inform following vehicles of dangerous road conditions, such as accumulated snow, compacted snow, freezing, and flooding.

SUMMARY

With the following vehicles thus informed of dangerous road conditions, drivers of the following vehicles may be encouraged to drive safely when passing a road in a dangerous road condition, or avoid passing the road, as described in JP 2017-151942 A. As a result, the safety of traffic can be improved. However, the dangerous road condition may disappear as time passes, and the smoothness of traffic flow may deteriorate if the vehicles are kept informed even after the dangerous road condition disappears.

The disclosure provides an information processing device, information processing system, program, and information processing method, which curb reduction of the smoothness of traffic flow, while improving the safety of traffic.

An information processing device according to a first aspect of the disclosure includes an obtaining unit configured to obtain vehicle information including passability of a road and a position of the road, from a vehicle-mounted information processing device installed on a vehicle, a controller configured to create first warning information indicating that the position of the road is non-passable when the passability of the road in the vehicle information indicates non-passable, and create recovery information indicating that the position of the road becomes passable, when the passability of the road at the same position as the position of the road in the first warning information, in another piece of the vehicle information, indicates passable, after creation of the first warning information, and a giving unit configured to give the first warning information and the recovery information.

An information processing system according to a second aspect of the disclosure includes a vehicle-mounted information processing device configured to give vehicle information including passability of a road based on a surrounding image, and a position of the road, and an information processing device. The information processing device has a controller configured to create first warning information indicating that the position of the road is non-passable when the passability of the road in the vehicle information indicates non-passable, and create recovery information indicating that the position of the road is passable, when the passability of the road at the same position as the position of the road in the first warning information, in the vehicle information, indicates passable, after creation of the first warning information, and a giving unit configured to give the first warning information and the recovery information A program according to a third aspect of the disclosure causes an information processing device to execute a step of obtaining vehicle information including passability of a road and a position of the road, from a vehicle-mounted information processing device installed on a vehicle, a step of creating first warning information indicating that the position of the road is non-passable, when the passability of the road in the vehicle information indicates non-passable, a step of giving the first warning information, a step of obtaining vehicle information including the passability and the position of the road from the vehicle-mounted information processing device installed on the vehicle, after giving the first warning information, a step of creating recovery information indicating that the position of the road is passable, when the passability of the road at the same position as the position of the road in the first warning information, in the vehicle information, indicates passable, and a step of giving the recovery information.

An information processing method according to a fourth aspect of the disclosure includes obtaining vehicle information including passability of a road and a position of the road, from a vehicle-mounted information processing device installed on a vehicle, creating first warning information indicating that the position of the road is non-passable, when the passability of the road in the vehicle information indicates non-passable, giving the first warning information, obtaining vehicle information including the passability and the position of the road from the vehicle-mounted information processing device installed on the vehicle, after giving the first warning information, creating recovery information indicating that the position of the road is passable, when the passability of the road at the same position as the position of the road in the first warning information, in the vehicle information, indicates passable, and giving the recovery information.

The information processing device, information processing system, program, and information processing method according to the above aspects of the disclosure make it possible to curb reduction of the smoothness of traffic flow, while improving the safety of traffic.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of the disclosure will be described with reference to the drawings.

Figure 1:
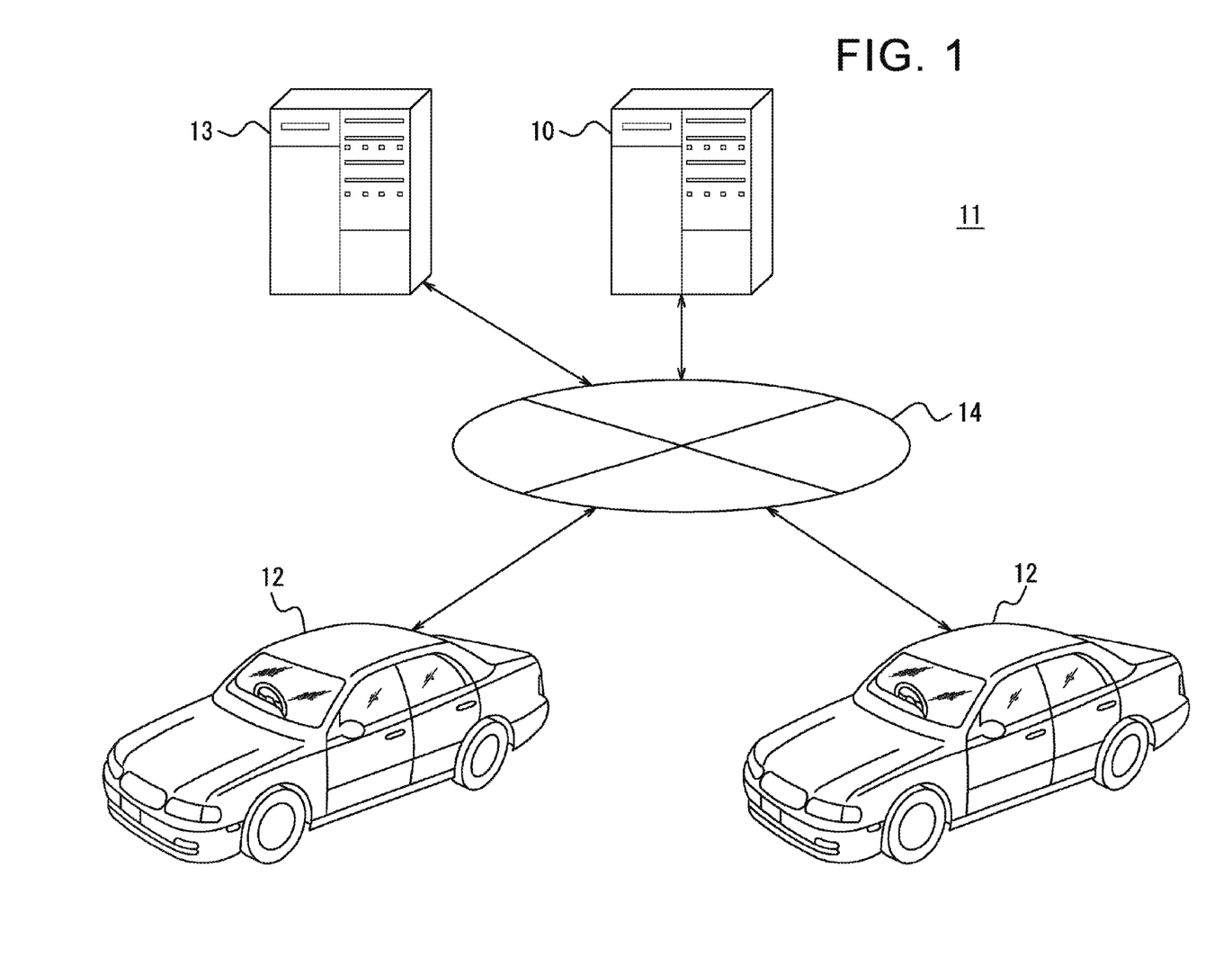
FIG. 1 is a configuration diagram showing the overall configuration of an information processing system including an information processing device according to one embodiment of the disclosure.

Referring to FIG. 1, an information processing system 11 including an information processing device 10 according to one embodiment of the disclosure will be briefly described. The information processing system 11 includes vehicles 12, information processing device 10, and information provision device 13. Each vehicle 12 is an automobile, for example, but is not limited to this, but may be any type of vehicle. While two vehicles 12 are illustrated in FIG. 1, for the sake of simplicity of description, the number of the vehicles 12 included in the information processing system 11 may be any value equal to or larger than one. Each of the information processing device 10 and the information provision device 13 includes one server device, or two or more server devices that can communicate with each other. The vehicles 12, information processing device 10, and information provision device 13 are connected to a network 14 including a mobile telecommunication network and the Internet, for example, such that they can communicate with the network 14.

In this embodiment, each vehicle 12 gives vehicle information to the information processing device 10. The vehicle information includes a wide variety of information detected by the vehicle 12 itself, and information obtained by processing the detected information. When passability of a certain road included in the vehicle information obtained from the vehicle 12 indicates "non-passable", the information processing device 10 creates first warning information indicating that the position of the road is non-passable, namely, the vehicle is unable to pass the road at the position. The information processing device 10 gives the first warning information to the vehicles 12 and the information provision device 13, for example. When the passability of the road in other vehicle information obtained after creation of the first warning information, where the road is at the same position as that of the road included in the first warning information, indicates "passable", the information processing device 10 creates recovery information indicating that the position of the road is passable, namely, the vehicle is able to pass the road at the position. The information processing device 10 gives the recovery information to the vehicles 12 and the information provision device 13, for example. The vehicles 12 can enjoy route searching based on the recovery information.

Thus, according to this embodiment, the passability of any given road is promptly detected from a large quantity of vehicles 12 traveling over a broad area. Further, the first warning information is given to the vehicles 12, etc. when the passability indicates "non-passable"; therefore, it is possible to promptly prevent the vehicles from passing the road when the road is determined as being non-passable. Further, when the road becomes passable after creation of the first warning information, passage of vehicles on the road concerned can be promptly resumed, so that smoothness of traffic flow can be made less likely or unlikely to be reduced.

Next, each component of the information processing system 11 will be described in detail.

Figure 2:
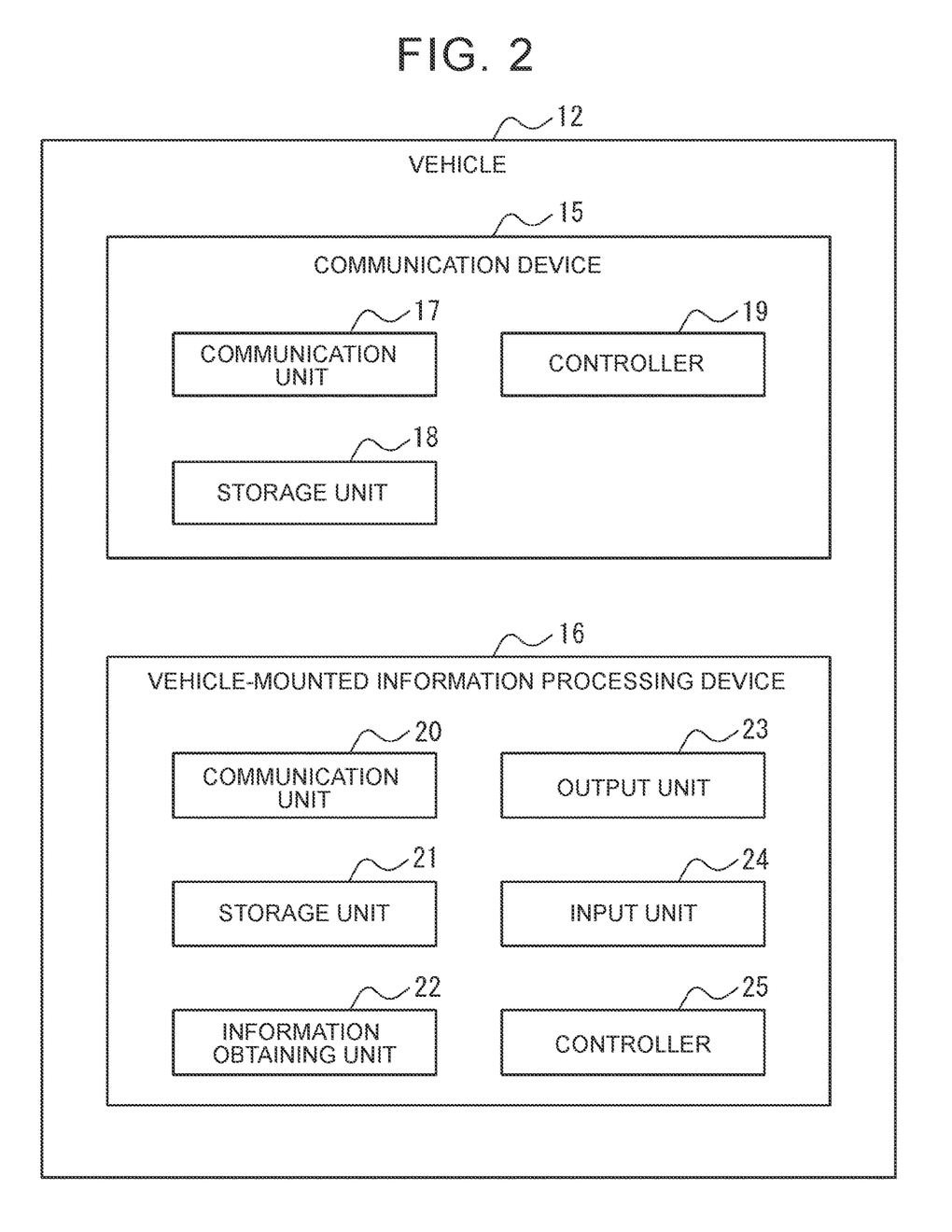
FIG. 2 is a functional block diagram showing the general configuration of a vehicle of FIG. 1.

As shown in FIG. 2, a communication device 15 and a vehicle-mounted information processing device 16 are installed on each vehicle 12. The communication device 15 and vehicle-mounted information processing device 16 are connected via an on-vehicle network, such as CAN (Controller Area Network), or exclusive line.

The communication device 15 is an on-vehicle communication device, such as a data communication module (DCM). More specifically, the communication device 15 includes a communication unit 17, storage unit 18, and controller 19.

The communication unit 17 includes a communication module that performs communications via the on-vehicle network or exclusive line. Also, the communication unit 17 includes a communication module connected to the network 14. For example, the communication unit 17 may include a communication module that complies with mobile communications standards, such as 4G (4th Generation) or 5G (5th Generation). In this embodiment, the vehicle 12 is connected to the network 14 via the communication unit 17.

The storage unit 18 includes one or more memories. In this embodiment, each of the memories may be a semiconductor memory, magnetic memory, or optical memory, for example, but is not limited to these types. Each memory included in the storage unit 18 may function as a main storage device, auxiliary storage device, or cache memory, for example. The storage unit 18 stores any information used for operation of the communication device 15. For example, the storage unit 18 may store system programs, application programs, and identification information of the vehicle 12. The identification information of the vehicle 12 is information that enables each of the vehicles 12 to be uniquely identified in the information processing system 11. The information stored in the storage unit 18 may be updated with information obtained from the network 14 via the communication unit 17, for example.

The controller 19 includes one or more processors. In this embodiment, each of the processors may be a general-purpose processor, or a dedicated processor for particular processing, but is not limited to these types. The controller 19 controls operation of the communication device 15 as a whole. In this embodiment, the vehicle 12 communicates with the information processing device 10, via the communication device 15 controlled by the controller 19. The vehicle 12 obtains and gives information, etc., by communicating with the information processing device 10.

The vehicle-mounted information processing device 16 is, for example, a navigation device that manages a wide variety of information in the vehicle 12. For example, the vehicle-mounted information processing device 16 collects detected information of the vehicle 12, which will be described later. The vehicle-mounted information processing device 16 gives the detected information thus collected, as it is, or as vehicle information obtained by processing the detected information, to the information processing device 10, via the communication device 15. The vehicle-mounted information processing device 16 includes a communication unit 20, storage unit 21, information obtaining unit 22, output unit 23, input unit 24, and controller 25.

The communication unit 20 includes a communication module that performs communications via an on-board network or exclusive line.

The storage unit 21 includes one or more memories. Each of the memories included in the storage unit 21 may function as a main storage device, auxiliary storage device, or cache memory, for example. The storage unit 21 stores any information used for operation of the vehicle-mounted information processing device 16. For example, the storage unit 21 may store system programs, application programs, and so forth. The information stored in the storage unit 21 may be updated with information obtained from the network 14 via the communication device 15, for example.

The information obtaining unit 22 obtains detected information detected by a wide variety of sensors installed on the vehicle 12, directly or via an electronic control unit (ECU). The detected information includes, for example, the position of the vehicle 12, surrounding image of the vehicle 12, relative position of a road around the vehicle, and time.

The position of the vehicle 12 is a position of the vehicle 12 on a map, which is detected by a GPS (Global Positioning System) receiver, for example. The surrounding image of the vehicle 12 indicates, for example, an image or images around the vehicle 12, on at least one of the front, rear, and lateral sides of the vehicle 12, which is/are captured by a vehicle-mounted camera or cameras. The vehicle-mounted camera may be a monocular camera or a stereo camera. The surrounding image may include an image of road conditions having an influence on the passability of the road around the vehicle 12. In other words, the surrounding image may include the passability of the road as its information. The passability of the road is based on a phenomenon, such as flooding on a road or freezing of a road, which disappears as time passes. Also, the passability of the road may be based on a phenomenon or event, such as a damaged road or a road occupied by an obstacle, which needs to be artificially eliminated. The relative position of the road around the vehicle indicates the position of the road around the vehicle 12, relative to the vehicle 12, which is detected by means of a stereo camera, ranging (distance measurement) sensor, such as LIDAR (Light Detection and Ranging), or the like. The above-mentioned time indicates a cyclic time provided by a timer, for example.

The output unit 23 includes one or more output interfaces that output information and inform the user of the information. For example, the output interface included in the output unit 23 is a display that outputs information visually, or a speaker that outputs information audibly, but is not limited to these types. For example, the display is a panel display, head-up display, or the like, but is not limited to these types. In this embodiment, the visual output may include texts, still images, and moving images or videos.

The input unit 24 includes one or more input interfaces that detect user input. For example, the input interface included in the input unit 24 is in the form of physical keys, capacitive keys, touch screen provided integrally with the panel display of the output unit 23, or a microphone that detects voice input, but is not limited to these types.

The controller 25 includes one or more processors. The controller 25 controls operation of the vehicle-mounted information processing device 16 as a whole.

The controller 25 may store a plurality of items of detected information obtained at the same time by the information obtaining unit 22, in the storage unit 21, such that these items of information are associated with each other, for example. The phrase "at the same time" means during a period from the time at which a periodic time given periodically by a timer is obtained, to the time at which the next periodic time is obtained. Also, when the information obtaining unit 22 obtains detected information, for example, the controller 25 may store the detected information in the storage unit 21, such that the information is associated with a time immediately before the detected information is obtained, among periodic times periodically given by the timer.

When the controller 25 obtains the surrounding image of the vehicle 12, it may extract an image of a road around the vehicle 12, from the surrounding image, as will be described later. Further, the controller 25 may estimate the passability of the road, based on the image of the road, create information on the passability, as information other than the image, and include it in the detected information. The passability of the road as information includes at least "passable" or "non-passable". The "passable" indicates good road conditions, which permit the vehicle 12 to travel on the road, without requiring the driver to be particularly conscious of safe driving. Also, the "non-passable" indicates poor road conditions, which make it difficult for the driver to run the vehicle 12, even if he/she pays particular attentions to the road conditions. Also, the passability of the road as information may include two or more stages between "passable" and "non-passable", of conditions in which the vehicle can travel on the road in a condition where the driver's consciousness of safe driving is raised. Also, the controller 25, which is configured to extract the road around the vehicle, may calculate the relative position of the road with respect to the vehicle 12, and include it in the detected information.

The controller 25 gives the detected information temporarily stored in the storage unit 21, to the information processing device 10, as vehicle information detected by the vehicle 12 itself. The controller 25 may give the vehicle information to the information processing device 10, in a cyclic manner, or on a regular basis, or at any time, such as when the surrounding image is obtained, for example.

When the input unit 24 detects input of a request for route searching made by the user, the controller 25 executes route searching, based on the first warning information, second warning information, and recovery information, which are obtained via the communication unit 20. The controller 25 may obtain the first warning information, second warning information, and recovery information, directly from the information processing device 10, or indirectly via the information provision device 13. The controller 25 causes the output unit 23 to output a proposed route based on the result of execution of route searching.

When controller 25 obtains the first warning information or second warning information, it performs route searching, while excluding nodes including the position of the road included in the first warning information or second warning information. When the controller 25 obtains the first warning information or second warning information, it may output the position of the road that is non-passable, via the output unit 23. Also, in the case where the controller 25 executes route searching while excluding a node including the position of the road included in the first warning information or second warning information, and then obtains recovering information with respect to the road at the same position, the controller 25 performs route searching, without excluding the node including the position of the road concerned. Also, when the controller 25 does not obtain either of the first warning information and the second warning information, too, it performs route searching without excluding any particular node.

When the input unit 24 detects input of a request for route searching made by the user, the controller 25 may give the request to the information processing device 10 or information provision device 13. The controller 25 may obtain a proposed route created by the information processing device 10 or information provision device 13 in response to the request for route searching, and output the proposed route via the output unit 23.

Figure 3:
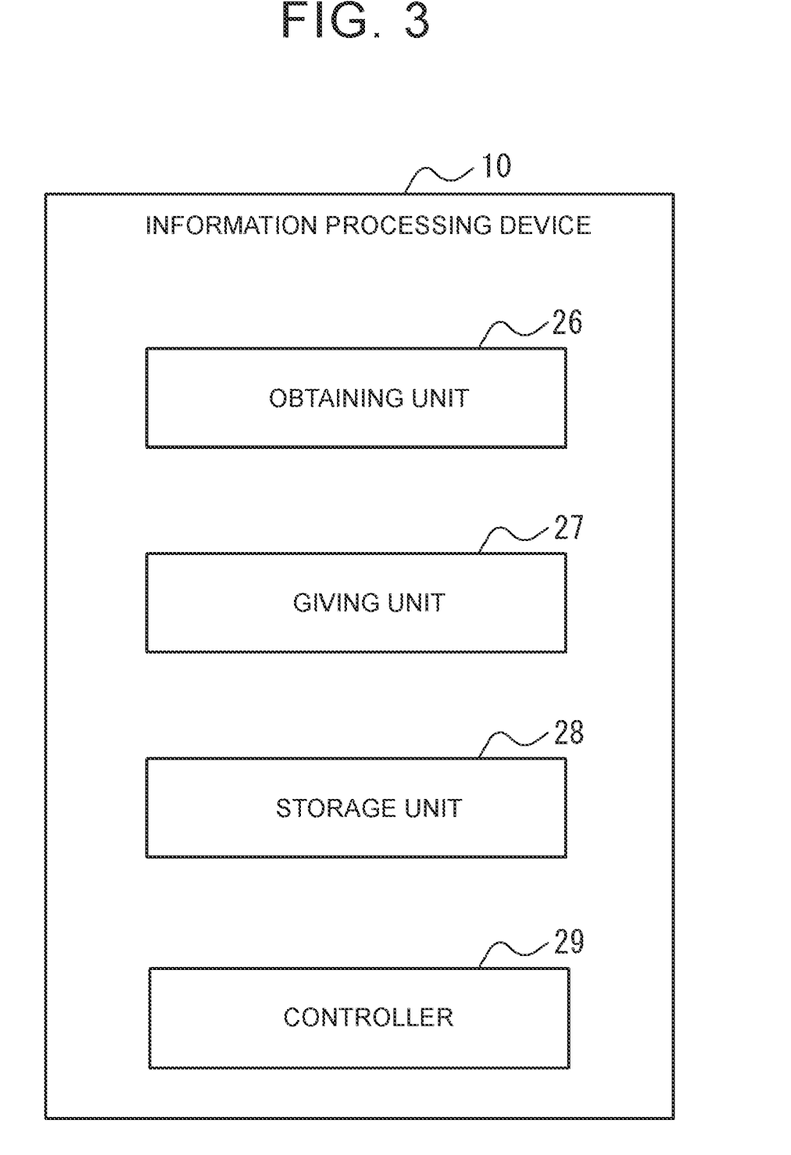
FIG. 3 is a functional block diagram showing the general configuration of the information processing device of FIG. 1.

As shown in FIG. 3, the information processing device 10 includes an obtaining unit 26, giving unit 27, storage unit 28, and controller 29.

The obtaining unit 26 includes a communication module connected to the network 14, for example. The obtaining unit 26 may include a communication module that complies with wired LAN (Local Area Network) standards, for example. In this embodiment, the information processing device 10 is connected to the network 14 via the obtaining unit 26. The obtaining unit 26 is able to obtain vehicle information from each vehicle 12. Also, in the information processing device 10 adapted to execute route searching for the vehicle 12, the obtaining unit 26 may be able to obtain a request for route searching, from the vehicle 12.

The giving unit 27 includes a communication module connected to the network 14, for example. The giving unit 27 may include a communication module that complies with the wired LAN standards, for example. The giving unit 27 gives the first warning information, second warning information, and recovery information, which will be described later, to at least one of the vehicles 12 and the information provision device 13. Also, in the information processing device 10 adapted to execute route searching for the vehicle 12, the giving unit 27 may give a proposed route to the vehicle 12. The giving unit 27 may be integral with the obtaining unit 26.

The storage unit 28 includes one or more memories. Each of the memories included in the storage unit 28 may function as a main storage device, auxiliary storage device, or cache memory, for example. The storage unit 28 stores any information used for operation of the information processing device 10. For example, the storage unit 28 may store system programs, application programs, map information, first warning information, and second warning information. The information stored in the storage unit 28 may be updated with information obtained from the network 14 via the obtaining unit 26, for example.

The controller 29 includes one or more processors. The controller 29 controls operation of the information processing device 10 as a whole.

When the controller 29 obtains vehicle information from the vehicle-mounted information processing device 16, it determines whether the vehicle information includes the passability of a road and the position of the road. When the vehicle information includes a surrounding image as one indicating the passability of the road, the controller 29 performs an image analysis, and extracts an image of the road around the vehicle 12 in the surrounding image. As will be described later, the position of the vehicle 12, or a position obtained by adding the position of the road relative to the vehicle 12, to the position of the vehicle 12, is regarded as the position of the road; therefore, the position of the road is considered as being included in the vehicle information provided that at least the position of the vehicle 12 is included in the vehicle information.

The controller 29 determines conditions of the road thus extracted. The controller 29 determines the passability of the road, at least between "passable" and "non-passable", based on the determination result of the road conditions.

For example, when the controller 29 determines that there is a puddle of water on the extracted road, it estimates the water depth of the puddle. The controller 29 may estimate the water depth, by determining the level of the water surface relative to an adjunct, such as a guardrail or a curb, to the road, or through machine learning. When the water depth is 20 cm or larger, for example, the controller 29 determines that flooding occurred, and the passability of the road is "non-passable". When the water depth is less than 20 cm, for example, the controller 29 determines that the passability of the road is "passable".

When the controller 29 determines that snow is accumulated on the extracted road, for example, it determines conditions of accumulated snow. For example, the controller 29 determines the height of the accumulated snow and the area of freezing, as conditions of accumulated snow. The controller 29 may estimate the height of the accumulated snow, by determining the level of the snow surface relative to an adjunct, such as a guardrail or a curb, to the road, or through machine learning, for example. The controller 29 may determine the area of freezing, by estimating an icing or freezing region from a reflected condition of light, or a degree of distortion of an image of a road marking or sign, and calculating the area of the region, for example. When the height of the accumulated snow is equal to or greater than 40 cm, or when the area of freezing includes a circle having a diameter of 1 m, for example, the controller 29 determines that the passability of the road is "non-passable". When the height of the accumulated snow is less than 40 cm, and the area of freezing does not include a circle having a diameter of 1 m, the controller 29 determines that the passability of the road is "passable".

When the controller 29 determines that the passability of the road is "non-passable", or when the controller 29 obtains vehicle information including the passability of the road as information other than the surrounding image and indicating "non-passable", the controller 29 regards the passability of the road as being "non-passable" in the obtained vehicle information. When the passability of the road in the vehicle information indicates "non-passable", the controller 29 creates first warning information indicating that the position of the road included in the vehicle information is non-passable, namely, the vehicles cannot pass the road at the position included in the vehicle information. The controller 29 stores the first warning information thus created, in the storage unit 28.

The controller 29 may recognize the position of a road based on the vehicle information, and regard the recognized position of the road as the position of the road that is "non-passable" in the first warning information. The controller 29 may regard the position of the vehicle 12 included in the vehicle information, for example, as the position of the road. When the controller 29 obtains vehicle information including the position of the road relative to the vehicle 12, it may regard a position obtained by adding the relative position to the position of the vehicle 12 included in the vehicle information, as the position of the road. When the controller 29 extracts a road around the vehicle, based on the surrounding image, it may also calculate the position of the road relative to the vehicle 12, and regard a position obtained by adding the relative position to the position of the vehicle 12 included in the vehicle information, as the position of the road.

When the passability of the road in the vehicle information indicates "non-passable" because of occurrence of flooding, the controller 29 may recognize a source of water that caused flooding to occur at the position of the road in the vehicle information. For example, the controller 29 reads a rainfall region in the vicinity of the position of the road, from a server of the Ministry of the Environment, for example, which provides weather information, so as to recognize the rainfall region as the source of water. The vicinity of the position of the road includes a range in which a distance from the road position to the outer edge of the rainfall region is less than 100 m, for example. The controller 29 may also recognize the source of water by another method.

When the controller 29 can recognize the source of water, it may select a region that is lower in altitude than the position of the road, from the entire region between the source of water, and the position of the road included in the vehicle information, based on map information. The controller 29 may determine the presence or absence of a road that is a depression in the selected region, based on the map information. When there is a road that is a depression, the controller 29 may create second warning information indicating that the position of the depression on the road is "non-passable". The controller 29 may store the second warning information thus created, in the storage unit 28.

The controller 29 may give the first warning information and second warning information to an external device or devices, via the giving unit 27. As described above, the controller 29 gives the first warning information and second warning information to the vehicles 12 and the information provision device 13, for example.

Also, in the information processing device 10 having the function of proposing a route in response to a request for route searching from the vehicle 12, the controller 29 may use the first warning information and the second warning information during route searching. The controller 29 may execute route searching while excluding a node including the position of the road included in the first warning information or second warning information. After execution of route searching, the controller 29 may give the proposed route, to the vehicle 12 that made the request for route searching.

When the controller 29 presumes that the passability of the road is "passable", or when it obtains vehicle information including the passability of the road as information other than the surrounding image and indicating "passable", the controller 29 regards the passability of the road as being "passable" in the obtained vehicle information. When the passability of the road indicates "passable" in the obtained vehicle information, the controller 29 determines whether the first warning information or second warning information is stored in the storage unit 28, with respect to the road at the same position as the position of the road included in the vehicle information.

When the first warning information or second warning information is stored in the storage unit 28 with respect to the road at the same position, the controller 29 creates recovery information indicating that the position of the road is "passable". When the controller 29 creates the recovery information, it may delete the first warning information and the second warning information stored in the storage unit 28, with regard to the road at the same position as the position of the road indicating "passable" in the recovery information.

The controller 29 gives the recovery information to an external device or devices, via the giving unit 27. As described above, the controller 29 gives the recovery information to the vehicles 12 and the information provision device 13, for example.

In the information processing device 10 having the function of proposing a route in response to a request for route searching from the vehicle 12, when route searching using the first warning information and the second warning information has already been done, the controller 29 may execute route searching again, without excluding the node including the position of the road included in the recovery information. After execution of route searching, the controller 29 may give the proposed route again, to the vehicle 12 to which the proposed route based on the first warning information and the second warning information has already been given.

Figure 4:
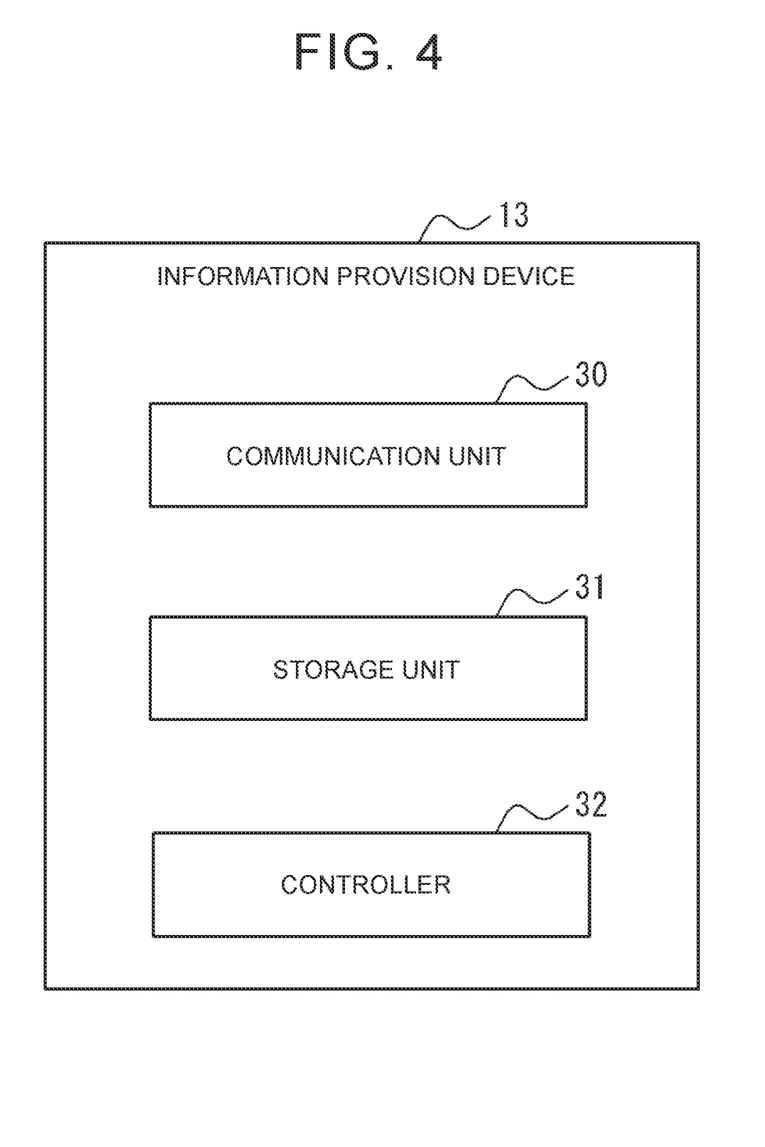
FIG. 4 is a functional block diagram showing the general configuration of an information provision device of FIG. 1.

As shown in FIG. 4, the information provision device 13 includes a communication unit 30, storage unit 31, and controller 32. The information provision device 13 may provide the vehicles 12 with traffic information, for example. The information provision device 13 may give the first warning information, second warning information, and recovering information obtained from the information processing device 10, as traffic information, to the vehicles 12. The information provision device 13 may perform route searching, in response to a request for route searching from the vehicle 12, and provide the vehicle 12 with a proposed route.

The communication unit 30 includes a communication module connected to the network 14. For example, the communication unit 30 may include a communication module that complies with mobile communications standards, such as 4G (4th Generation) or 5G (5th Generation). In this embodiment, the information provision device 13 is connected to the network 14 via the communication unit 30.

The storage unit 31 includes one or more memories. Each of the memories included in the storage unit 31 may function as a main storage device, auxiliary storage device, or cache memory, for example. The storage unit 31 stores any information used for operation of the information provision device 13. For example, the storage unit 31 may store system programs, application programs, first warning information, second warning information, recovery information, and so forth. The information stored in the storage unit 31 may be updated with information obtained from the network 14 via the communication unit 30, for example.

The controller 32 includes one or more processors. The controller 32 controls operation of the information provision device 13 as a whole.

When the controller 32 obtains any of the first warning information, second warning information, and recovery information, from the information processing device 10, via the communication unit 30, it may store the information in the storage unit 31. When the controller 32 obtains the recovery information, it may delete the first warning information and second warning information, with regard to the road at the same position as the position of the road included in the recovery information, from the storage unit 31.

The controller 32 gives the first warning information, second warning information, and recovery information stored in the storage unit 31, to the vehicles 12, via the communication unit 30. The controller 32 may give the above information to each vehicle 12, in a cyclic manner, or on a regular basis, or at any time, such as when it receives a request from the vehicle 12, for example. The controller 32 may delete recovery information from the storage unit 31, after giving the recovery information for the first time, or after giving the recovery information two or more times, for example.

As described above, in the information provision device 13 having a function of proposing a route in response to a request for route searching from the vehicle 12, the controller 32 may execute route searching, based on a request for route searching which is obtained from the vehicle 12.

When the first warning information and the second warning information are stored in the storage unit 31, the controller 32 may execute route searching, while excluding a node including the position of the road included in the first warning information or second warning information. After executing route searching, the controller 32 may give a proposed route, to the vehicle 12 that made the request for route searching.

In the case where the controller 32 has searched for a route, using the first warning information and the second warning information, and obtains recovery information with regard to the road at the same position, it may execute route searching again, without excluding the node including the position of the road included in the recovery information. After executing route searching, the controller 32 may give a proposed route again, to the vehicle 12 that has already been provided with the route proposed based on the first warning information and the second warning information.

Figure 5:
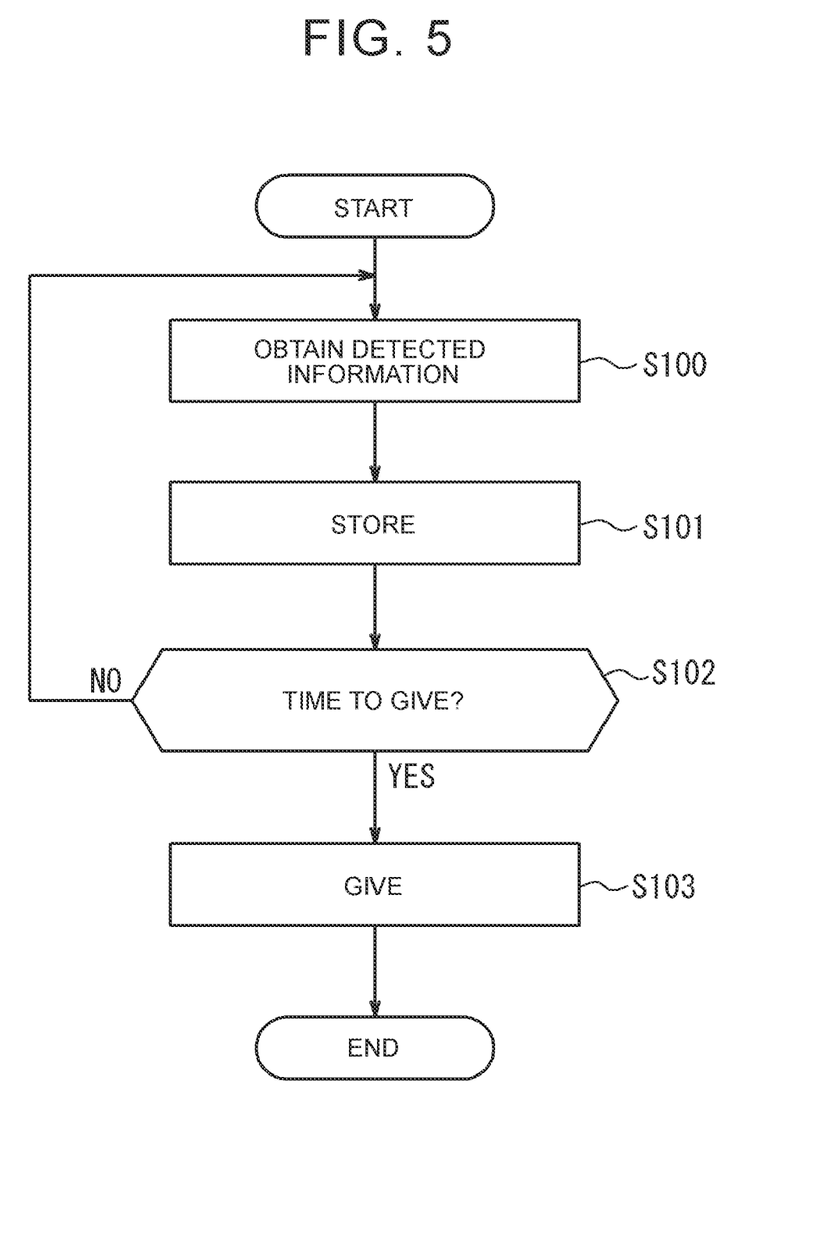
FIG. 5 is a flowchart illustrating a vehicle information giving process executed by a controller of a vehicle-mounted information processing device which does not perform extraction of roads.

Next, a vehicle information giving process executed by the controller 25 of the vehicle-mounted information processing device 16 according to this embodiment, where the controller 25 does not extract images of roads, will be described using the flowchart of FIG. 5. The vehicle information giving process is started at the same time that vehicle information is given to the information processing device 10.

In step S100, the controller 25 obtains detected information. After obtaining the detected information, the controller 25 proceeds to step S101.

In step S101, the controller 25 stores the detected information obtained in step S100, in the storage unit 21, such that the information is associated with the time at which it was obtained. After storing the detected information, the controller 25 proceeds to step S102.

In step S102, the controller 25 determines whether the present time is the time to give vehicle information. When it is not the time to give vehicle information, the controller 25 returns to step S100. When it is the time to give vehicle information, the controller 25 proceeds to step S103.

In step S103, the controller 25 gives a plurality of types of detected information stored in association with the time in step S101, as vehicle information, to the information processing device 10, via the communication unit 20. After giving the vehicle information, the vehicle information giving process ends.

Figure 6:
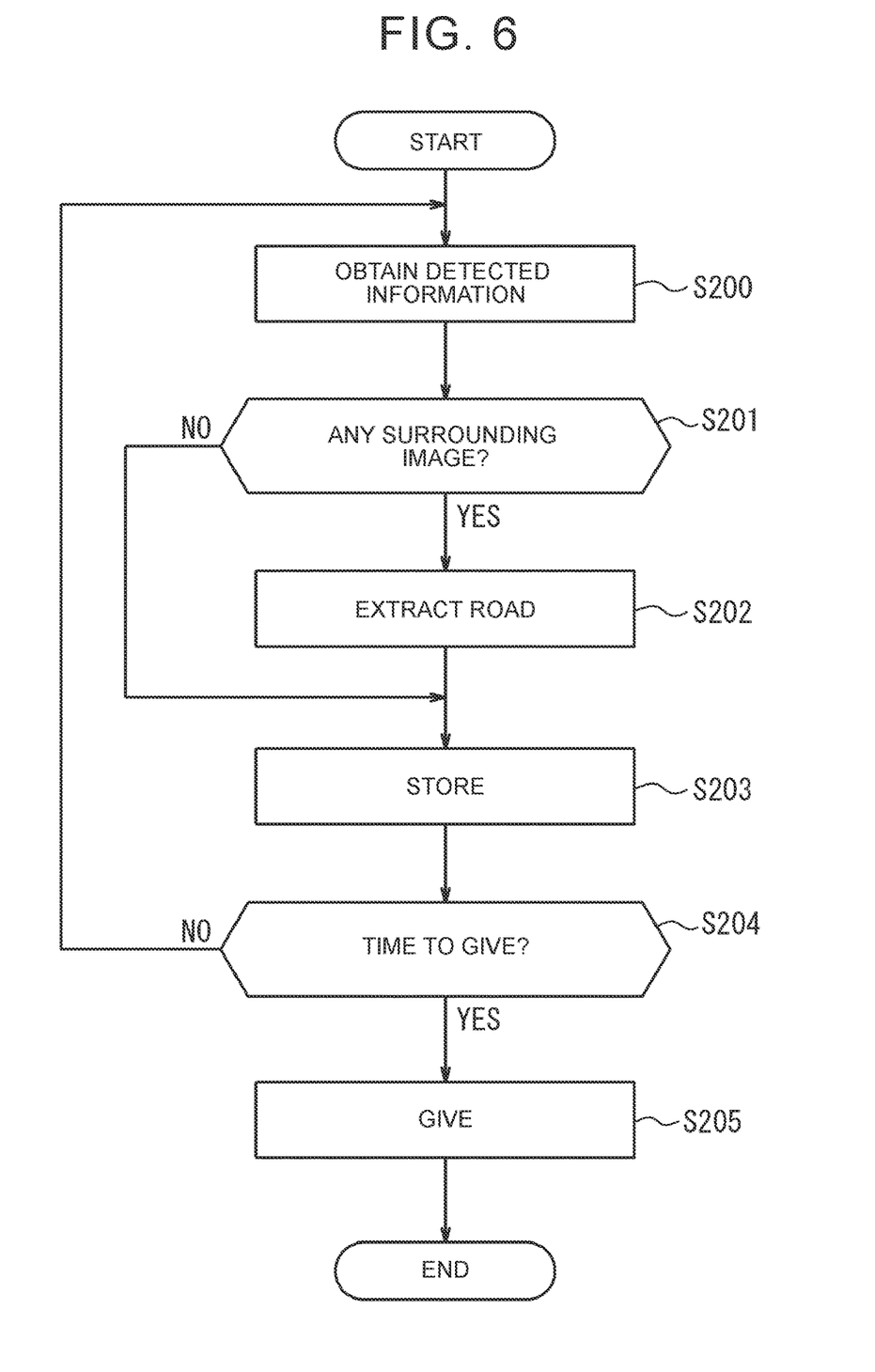
FIG. 6 is a flowchart illustrating a vehicle information giving process executed by the controller of the vehicle-mounted information processing device which performs extraction of roads.

Next, a vehicle information giving process executed by the controller 25 of the vehicle-mounted information processing device 16 according to this embodiment, where the controller 25 extracts images of roads, will be described using the flowchart of FIG. 6. The vehicle information giving process is started at the same time that vehicle information is given to the information processing device 10, for example.

In step S200, the controller 25 obtains detected information. After obtaining the detected information, the controller 25 proceeds to step S201.

In step S201, the controller 25 determines whether a surrounding image is included in the vehicle information obtained in step S200. When the surrounding image is included, the controller 25 proceeds to step S202. When the surrounding image is not included, the controller 25 proceeds to step S203.

In step S202, the controller 25 extracts an image of a road, from the surrounding image in the vehicle information obtained in step S200. The controller 25 estimates the passability of the road, based on the extracted image of the road. Also, the controller 25 calculates the relative position of the road, based on the surrounding image. After extraction, the controller 25 proceeds to step S203.

In step S203, the controller 25 stores the detected information obtained in step S200, the passability of the road when the passability of the road can be estimated in step S202, the relative position of the road when it is calculated in step S202, in the storage unit 21, in association with the respective times at which these items of information were obtained. After storing the information, the controller 25 proceeds to step S204.

In steps S204, S205, the controller 25 performs the same operation as steps S102, S103 of the vehicle information giving process executed by the controller 25 that does not extract images of objects. In step S205, the controller 25 gives the vehicle information, and the vehicle information giving process ends.

Figure 7:
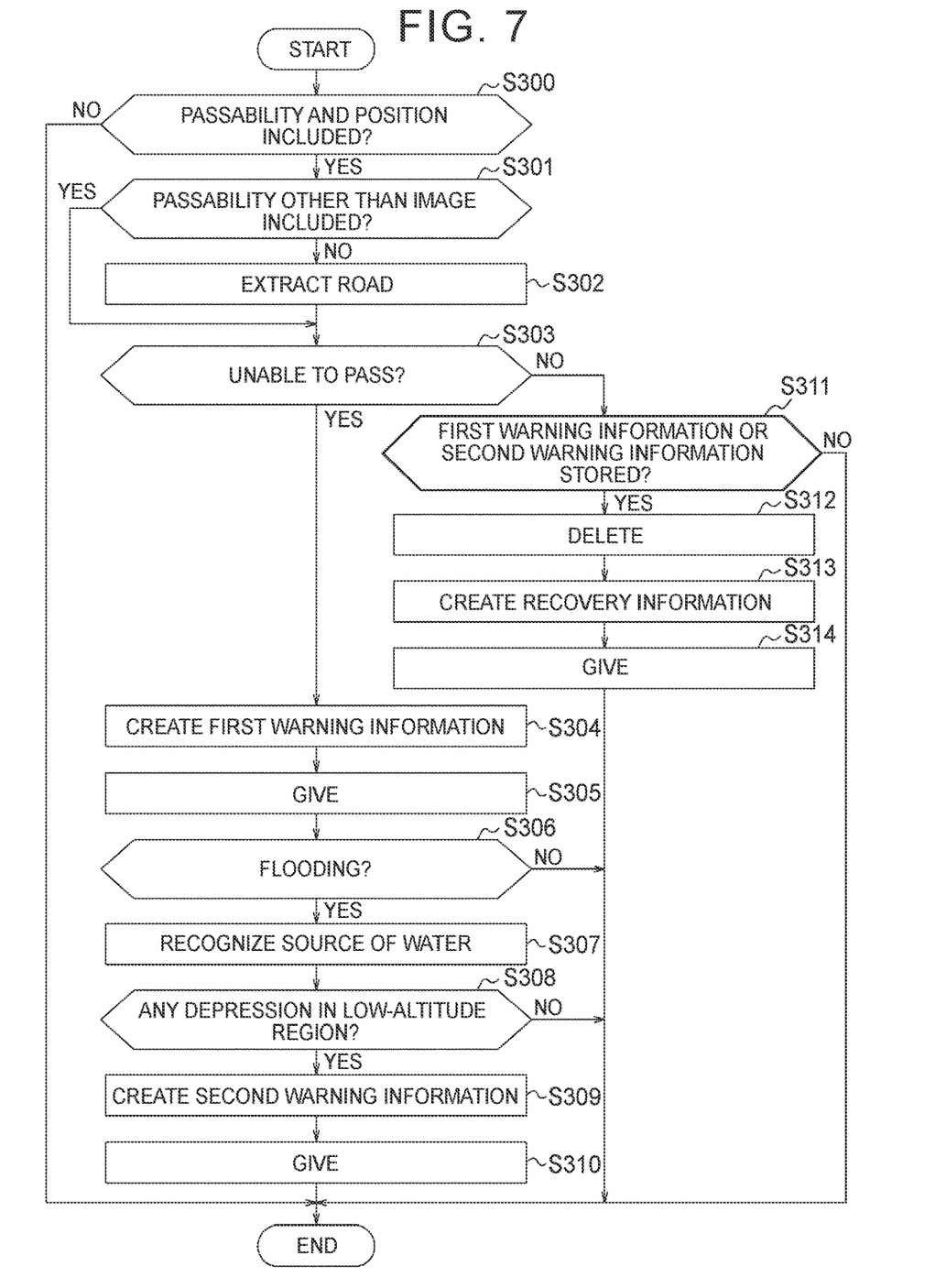
FIG. 7 is a flowchart illustrating a road condition checking process executed by a controller of FIG. 3.

Next, a road condition checking process executed by the controller 29 of the information processing device 10 according to this embodiment will be described using the flowchart of FIG. 7. The road condition checking process is started each time the vehicle information is obtained, for example.

In step S300, the controller 29 determines whether the obtained vehicle information includes the passability of a road and the position of the road. When the vehicle information does not include the passability or the position, the road condition checking process ends. When the vehicle information includes the passability and the position, the controller 29 proceeds to step S301.

In step S301, the controller 29 determines whether the passability of the road is included in the vehicle information, in a form other than the surrounding image. When the passability of the road is included as information in the form other than the surrounding image, the controller 29 proceeds to step S303. When the passability of the road is included in the form of the surrounding image, the controller 29 proceeds to step S302.

In step S302, the controller 29 extracts an image of the road, in the surrounding image in the obtained vehicle information. The controller 29 estimates the passability of the road, based on the extracted image of the road. Also, the controller 29 calculates the relative position of the road based on the surrounding image. After extracting the road image, the controller 29 proceeds to step S303.

In step S303, the controller 29 determines whether the passability of the road in the obtained vehicle information, or the passability of the road estimated in step S302, is "non-passable". When it is not "non-passable", the controller 29 proceeds to step S311. When it is "non-passable", the controller 29 proceeds to step S304.

In step S304, the controller 29 creates the first warning information that informs that the vehicle 12 cannot pass the road at the position included in the vehicle information. Further, the controller 29 stores the created first warning information in the storage unit 28. After creating the first warning information, the controller 29 proceeds to step S305.

In step S305, the controller 29 gives the first warning information created and stored in step S304, to the vehicles 12 or the information provision device 13. After giving the first warning direction, the controller 29 proceeds to step S306.

In step S306, the controller 29 determines whether the passability is determined as "non-passable" in step S303 because of flooding. When the passability that is "non-passable" is not caused by flooding, the road condition checking process ends. When the passability that is "non-passable" is caused by flooding, the controller 29 proceeds to step S307.

In step S307, the controller 29 recognizes a source of water which caused flooding at the position of the road included in the vehicle information. After recognizing the source of water, the controller 29 proceeds to step S308.

In step S308, the controller 29 determines whether there is a depression in a region that is lower in altitude than the road, between the position of the road included in the vehicle information, and the source of water recognized in step S307. When there is no depression, the road condition checking process ends. When there is such a depression, the controller 29 proceeds to step S309.

In step S309, the controller 29 creates the second warning information. Further, the controller 29 stores the created second warning information in the storage unit 28. After creating the information, the controller 29 proceeds to step S310.

In step S310, the controller 29 gives the second warning information created and stored in step S309, to the vehicles 12 or the information provision device 13. After giving the information, the road condition checking process ends.

In step S311 to which the controller 29 proceeds when the road is passable in step S303, the controller 29 determines whether the first warning information or the second warning information is stored in the storage unit 28, with respect to the same position as the position of the road included in the vehicle information. When neither the first warning information nor the second warning information is stored, the road condition checking process ends. When the first warning information or the second warning information is stored, the controller 29 proceeds to step S312.

In step S312, the controller 29 deletes the first warning information or second warning information, which was determined in step S311 as being stored, from the storage unit 28. After deleting the information, the controller 29 proceeds to step S313.

In step S313, the controller 29 creates recovery information. After creating the recovery information, the controller 29 proceeds to step S314.

In step S314, the controller 29 gives the recovery information created in step S313, to the vehicles 12 or the information provision device 13. After giving the information, the road condition checking process ends.

Figure 8:
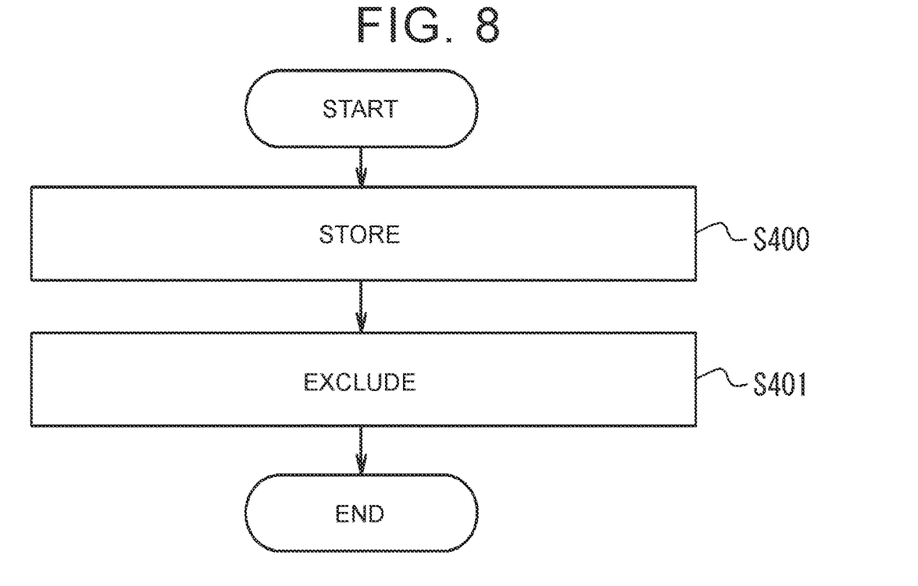
FIG. 8 is a flowchart illustrating a first node setting process executed by the controller of the vehicle-mounted information processing device of FIG. 2.

Next, a first node setting process executed by the controller 25 of the vehicle-mounted information processing device 16 according to this embodiment will be described using the flowchart of FIG. 8. The first node setting process is started after the first warning information or second warning information is obtained from the information processing device 10.

In step S400, the controller 25 stores the obtained first warning information or second warning information in the storage unit 21. After storing the information, the controller 25 proceeds to step S401.

In step S401, the controller 25 excludes a node including the position of the road included in the first warning information or second warning information stored in step S400, from adoptable nodes used for route searching. The adoptable nodes are nodes that can be used for route searching, among all nodes stored in the storage unit 21, and are stored in the storage unit 21. After excluding the above node, the first node setting process ends.

Figure 9:
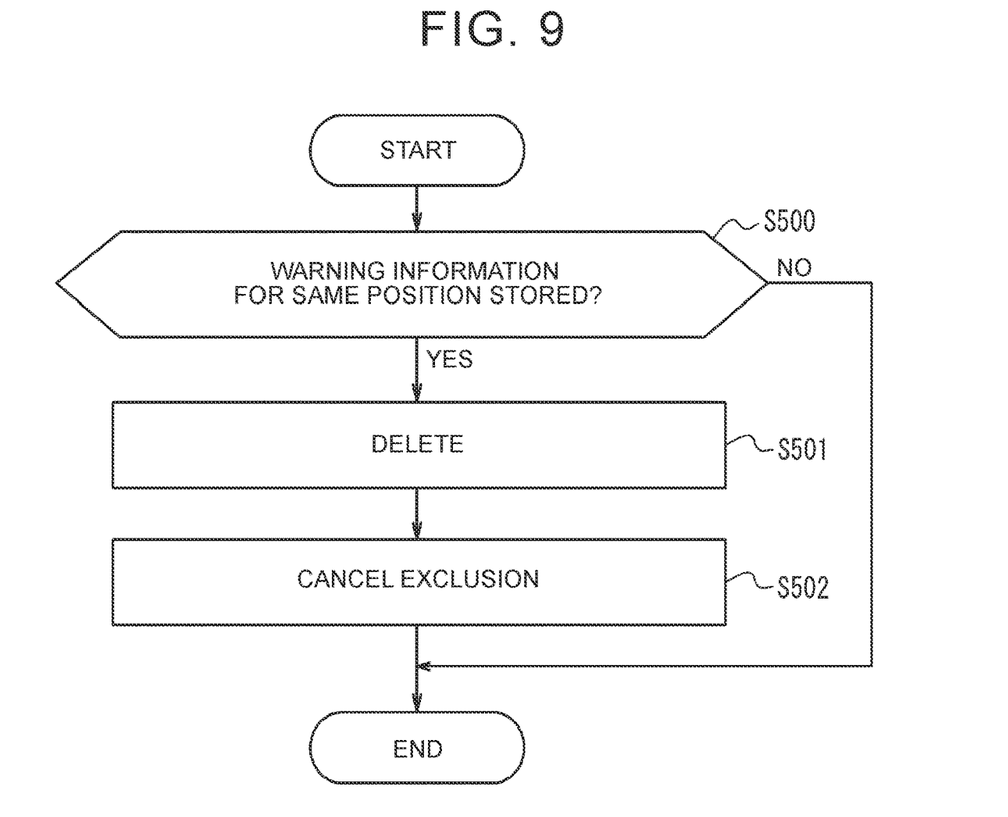
FIG. 9 is a flowchart illustrating a second node setting process executed by the controller of the vehicle-mounted information processing device of FIG. 2.

Next, a second node setting process executed by the controller 25 of the vehicle-mounted information processing device 16 in this embodiment will be described using the flowchart of FIG. 9. The second node setting process is started after the recovery information is obtained from the information processing device 10.

In step S500, the controller 25 determines whether the first warning information or second warning information for the same position as the position of the road included in the obtained recovery information is stored in the storage unit 21. When the first warning information or second warning information for the same position is not stored, the second node setting process ends. When the first warning information or second warning information for the same position is stored, the controller 25 proceeds to step S501.

In step S501, the controller 25 deletes the first warning information or second warning information determined as being stored in the storage unit 21 in step S500, from the storage unit 21. After the deletion, the controller 25 proceeds to step S502.

In step S502, the controller 25 cancels exclusion of the node including the position of the road included in the obtained recovery information, from the adoptable nodes. After the cancellation, the second node setting process ends.

Figure 10:
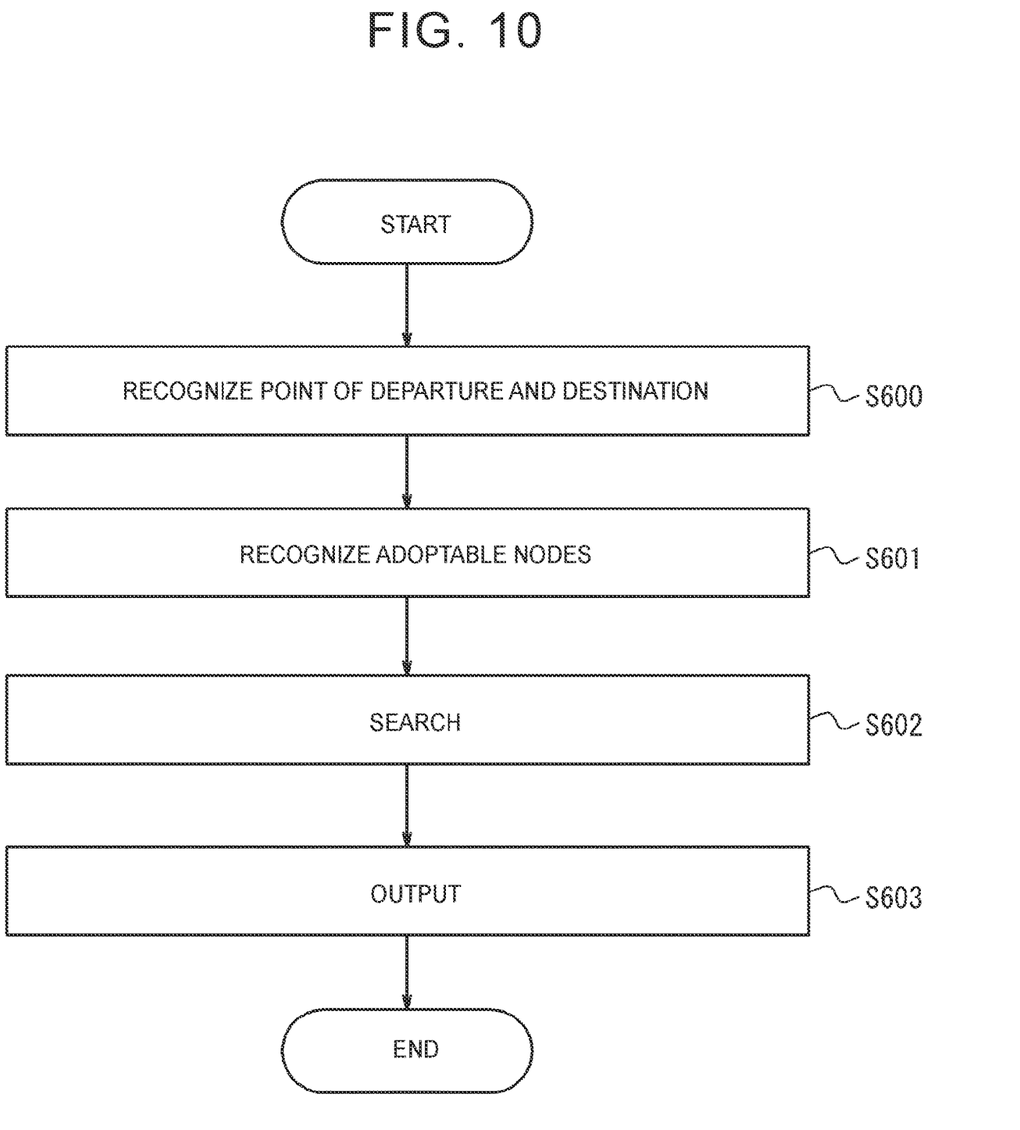
FIG. 10 is a flowchart illustrating a route searching process executed by the controller of the vehicle-mounted information processing device of FIG. 2.

Next, a route searching process executed by the controller 25 of the vehicle-mounted information processing device 16 in this embodiment will be described using the flowchart of FIG. 10. The route searching process is stated in a cyclic manner, or on a regular basis, or at any time, such as when any of the first warning information, second warning information, and recovery information is obtained, after detection of input of a request for route searching in the input unit 24, and during output of a proposed route.

In step S600, the controller 25 recognizes a point of departure and a destination set in route searching. After the recognition, the controller 25 proceeds to step S601.

In step S601, the controller 25 recognizes the adoptable nodes. After the recognition, the controller 25 proceeds to step S602.

In step S602, the controller 25 performs route searching, based on the point of departure and destination recognized in step S600, adoptable nodes recognized in step S601, and all links stored in the storage unit 21. After searching, the controller 25 proceeds to step S603.

In step S603, the controller 25 outputs the proposed route determined through route searching in step S602, to the output unit 23. After output of the proposed route, the route searching process ends.

The information processing device 10 of this embodiment configured as described above creates and gives the first warning information when the passability of the road in the vehicle information indicates "non-passable". With this configuration, the information processing device 10 directly or indirectly informs a large number of vehicles 12 of a non-passable road or roads, so that the safety of traffic can be improved. Further, the information processing device 10 creates and gives the recovery information when the vehicle information indicates "passable", with respect to the road at the same position after creation of the first warning information. With this configuration, the information processing device 10 directly or indirectly informs a large number of vehicles 12 that the road that was once determined as "non-passable" is recovered and becomes passable, so that the number of the vehicles 12 that avoid traveling on the road can be reduced, and the smoothness of traffic flow can be made less likely or unlikely to be reduced.

Also, when the passability of the road indicates "non-passable" because of flooding, the information processing device 10 of this embodiment determines whether there is a depression in a region that is lower in altitude than the position of the road, between the recognized source of water and the position of the road that is "non-passable", and creates and gives the second warning information indicating that the position of the depression is "non-passable". With this configuration, the information processing device 10 can directly or indirectly inform a large number of vehicles 12 that the vehicles 12 are unable to pass the position where flooding is highly likely to occur, without relying on surrounding images. Accordingly, the information processing device 10 can further improve the safety of traffic.

While the disclosure has been described above based on the drawings and the embodiment, it is to be understood that various changes and modifications can be easily made by those skilled in the art, based on this disclosure. Accordingly, it is to be noted that these changes and modifications are included in the scope of the disclosure. For example, functions, etc. included in respective components or steps can be re-arranged unless they are logically inconsistent, and two or more means or steps may be combined into one, or may be divided.

In the illustrated embodiment, the communication device 15 is the on-board communication device, and the vehicle-mounted information processing device 16 is the navigation device installed on the vehicle 12. However, a part or the whole of processing operation performed by the communication device 15 and the vehicle-mounted information processing device 16 may be performed by any electronic device, such as a smartphone or computer, for example.

For example, a part of processing operation performed by the vehicle-mounted information processing device 16 in the above embodiment may be performed by the information processing device 10 or the information provision device 13, and a part of processing operation performed by the information processing device 10 may be performed by the vehicle-mounted information processing device 16 or the information provision device 13.

For example, a general-purpose electronic device, such as a smartphone or computer, may be configured to function as the communication device 15, vehicle-mounted information processing device 16, information processing device 10, or information provision device 13 according to the above embodiment. More specifically, a program that describes the content of processing for implementing each function of the communication device 15, for example, according to the embodiment is stored in a memory of the electronic device, and the program is read and executed by a processor of the electronic device. Thus, the disclosure involved with this embodiment can be implemented in the form of a program that can be run by a processor.

In the illustrated embodiment, the controller 29 of the information processing device 10 estimates the passability of the road, based on the vehicle information. However, the controller 29 may obtain and estimate the passability of the road, based on surrounding images obtained from fixed point cameras or information other than images.

What is claimed is:

1. An information processing device comprising:
an obtaining unit configured to obtain vehicle information including passability of a road including a first road and a second road and a position of the road including the first road and the second road, from a vehicle-mounted information processing device installed on a vehicle;
a controller configured to:
create first warning information indicating that the position of the first road is non-passable when the passability of the first road in the vehicle information indicates non-passable based on images obtained from a vehicle located at the position of the first road,
create recovery information indicating that the position of the first road has become passable, when the passability of the road at the same position as the position of the first road in the first warning information, in another piece of the vehicle information, indicates passable, after creation of the first warning information; and
a giving unit configured to give the first warning information and the recovery information, wherein
the controller is further configured to, when the passability of the first road indicates non-passable because of occurrence of flooding:
recognize a source of water that caused the flooding to occur at the position of the first road,
select a low altitude region that is lower in altitude than the position of the first road, and is between the position of the first road and the source of water,
determine whether a depression exists in the low altitude region, wherein the second road includes the depression in the low altitude region, and
based upon the determination that the depression exists in the low altitude region between the position of the first road that is non-passable and a position of the source of water, create second warning information indicating that the position of the second road is non-passable without being based on vehicle surrounding images; and
the giving unit is configured to give the second warning information.

2. The information processing device according to claim 1, wherein the passability of the road is based on a phenomenon that disappears as time passes.

3. An information processing system comprising:
a vehicle-mounted information processing device configured to give vehicle information including passability of a road including a first road and a second road based on a surrounding image, and a position of the road including the first road and the second road; and
an information processing device having
a controller configured to:
create first warning information indicating that the position of the first road is non-passable when the passability of the first road in the vehicle information indicates non-passable based on images obtained from a vehicle located at the position of the first road,
create recovery information indicating that the position of the first road has become passable, when the passability of the road at the same position as the position of the first road in the first warning information, in another piece of the vehicle information, indicates passable, after creation of the first warning information, and a giving unit configured to give the first warning information and the recovery information, wherein
the controller is further configured to, when the passability of the first road indicates non-passable because of occurrence of flooding:
recognize a source of water that caused the flooding to occur at the position of the first road,
select a low altitude region that is lower in altitude than the position of the first road, and is between the position of the first road and the source of water,
determine whether a depression exists in the low altitude region, wherein the second road includes the depression in the low altitude region, and
based upon the determination that the depression exists in the low altitude region between the position of the first road that is not-passable and a position of the source of water, create second warning information indicating that the position of the second road is non-passable without being based on vehicle surrounding images; and
the giving unit is configured to give the second warning information.

4. A non-transitory computer-readable medium storing instructions, the instructions comprising: a program that, when executed by one or more processors of an information processing device, executes the steps of:
obtaining vehicle information including passability of a road including a first road and a second road, and a position of the road including the first road and the second road, from a vehicle-mounted information processing device installed on a vehicle;
creating first warning information indicating that the position of the first road is non-passable, when the passability of the first road in the vehicle information indicates non-passable based on images obtained from a vehicle located at the position of the first road;
giving the first warning information;
obtaining vehicle information including the passability and the position of the first road from the vehicle-mounted information processing device installed on the vehicle, after giving the first warning information;
creating recovery information indicating that the position of the first road has become passable, when the passability of the first road at the same position as the position of the first road in the first warning information, in the vehicle information, indicates passable;
giving the recovery information;
when the passability of the first road indicates non-passable because of occurrence of flooding, recognizing a source of water that caused the flooding to occur at the position of the first road;
selecting a low altitude region that is lower in altitude than the position of the first road, and is between the position of the first road and the source of water;
determining whether a depression exists in the low altitude region, wherein the second road includes the depression in the low altitude region;
based upon the determination that the depression exists in the low altitude region between the position of the first road that is non-passable and a position of the source of water, creating second warning information indicating that the position of the second road is non-passable without being based on vehicle surrounding images; and
giving the second warning information.

5. An information processing method comprising:
obtaining vehicle information including passability of a road including a first road and a second road, and a position of the road including the first road and the second road, from a vehicle-mounted information processing device installed on a vehicle;
creating first warning information indicating that the position of the first road is non-passable, when the passability of the first road in the vehicle information indicates non-passable based on images obtained from a vehicle located at the position of the first road;
giving the first warning information;
obtaining vehicle information including the passability and the position of the first road from the vehicle-mounted information processing device installed on the vehicle, after giving the first warning information;
creating recovery information indicating that the position of the first road has become passable, when the passability of the first road at the same position as the position of the first road in the first warning information, in the vehicle information, indicates passable;
giving the recovery information;
when the passability of the first road indicates non-passable because of occurrence of flooding, recognizing a source of water that caused the flooding to occur at the position of the first road;
selecting a low altitude region that is lower in altitude than the position of the first road, and is between the position of the first road and the source of water;
determining whether a depression exists in the low altitude region, wherein the second road includes the depression in the low altitude region;
based upon the determination that the depression exists in the low altitude region between the position of the first road that is non-passable and a position of the source of water, creating second warning information indicating that the position of the second road is non-passable without being based on vehicle surrounding images; and
giving the second warning information.

6. The information processing device according to claim 1, wherein the giving unit is configured to give the first warning information, the recovery information and the second warning information to a network for distribution to other vehicles.

7. The information processing device according to claim 1, wherein the controller is further configured to propose a route in response to a request for route searching, wherein the proposed route utilizes the first warning information and the second warning information during route searching so as to exclude a node that includes the position of the road included in at least one of the first warning information and the second information.

* * * * *